(12) United States Patent
Pinto et al.

(10) Patent No.: US 7,441,386 B2
(45) Date of Patent: Oct. 28, 2008

(54) APPARATUS FOR FORMING TUBES IN NETS

(75) Inventors: Robert Pinto, Chicago, IL (US); Eggo Haschke, Deerfield, IL (US)

(73) Assignee: Poly-Clip System Corp., Mundelein, IL (US)

( * ) Notice: Subject to any disclaimer, the term of this patent is extended or adjusted under 35 U.S.C. 154(b) by 0 days.

(21) Appl. No.: 11/553,757

(22) Filed: Oct. 27, 2006

(65) Prior Publication Data
US 2008/0098691 A1  May 1, 2008

(51) Int. Cl.
*B65B 51/04* (2006.01)
*B65B 9/15* (2006.01)

(52) U.S. Cl. .................. 53/138.2; 53/138.4; 53/567; 53/576; 452/48

(58) Field of Classification Search ............ 53/417, 53/138.1–138.4, 567, 576; 452/22, 30–32, 452/34, 35, 37, 40, 46, 48, 51
See application file for complete search history.

(56) References Cited

U.S. PATENT DOCUMENTS

| | | | | |
|---|---|---|---|---|
| 3,805,480 | A * | 4/1974 | Cherio et al. ............. | 53/576 |
| 3,812,642 | A * | 5/1974 | Mintz et al. .............. | 53/567 |
| 4,771,510 | A * | 9/1988 | Kawai .................. | 53/567 |
| 5,042,234 | A * | 8/1991 | Evans et al. ............. | 53/576 |
| 5,172,536 | A * | 12/1992 | Miyahara ............... | 53/567 |
| 5,743,792 | A * | 4/1998 | Hanten et al. ............ | 452/48 |
| 6,146,261 | A * | 11/2000 | Bienert et al. ............ | 452/22 |
| 6,263,643 | B1 * | 7/2001 | Kovacs et al. ............ | 53/567 |
| 7,063,610 | B2 * | 6/2006 | Mysker ................. | 452/30 |
| 7,124,553 | B2 * | 10/2006 | Norton et al. ............ | 53/138.2 |
| 2005/0048886 | A1 * | 3/2005 | Mercuri ................ | 452/35 |
| 2006/0105690 | A1 * | 5/2006 | Wince et al. ............. | 452/32 |

FOREIGN PATENT DOCUMENTS

EP        68578 A2 *   1/1983

* cited by examiner

*Primary Examiner*—Stephen F Gerrity
(74) *Attorney, Agent, or Firm*—Trexler, Bushnell, Giangiorgi, Blackstone & Marr, Ltd.

(57) ABSTRACT

A net derucking rectifier system is described. The system has a stuffer, a product horn having an upstream end and a downstream end, the upstream end mounted to the stuffer, a netting tube having an upstream end and a downstream end, the netting tube removably mounted coaxially over the product horn and having a tubular netting shirred thereon, a bracket mounted coaxially to the netting tube and having a plurality of fingers pointing radially inward to grip the netting, the bracket movable between a first position near the upstream end and a second position near the downstream end, the fingers biased to grip the netting when the bracket is moved from the first position to the second position and not to grip the netting when the bracket is moved from the second position to the first position, and a clipper located adjacent the distal end of the netting tube. In another embodiment, a method of derucking a predetermined length of netting rucked on a tube, comprises gripping the netting in a first position on the tube, moving the gripped netting from the first position to a second position a predetermined distance axially along the tube, releasing the netting at the second position, and regripping the netting at the first position.

6 Claims, 5 Drawing Sheets

US 7,441,386 B2

APPARATUS FOR FORMING TUBES IN NETS

BACKGROUND OF THE INVENTION

This invention relates to the field of preparing food products in tubular casings and enclosing the products in netting. One method generally used in the industry is to pump food products, such as pasty sausage meat, whole muscle meats, or otherwise, through a product horn. The food products are forced into a tubular casing, which can be a pre-formed tube that is shirred onto the product horn, or a tube formed continuously from flat sheets of film. The tubular casing expands as filled into a coaxial netting. After processing, such as cooking or smoking, the netting will be removed, leaving a dimpled appearance on the food products that is considered pleasing to consumers. The edible casing will prevent the netting from sticking to the food product, so upon removal of the netting a clean appearance of the meat is maintained. (This process is not limited to meat; it can be used for cheeses, for vegetarian sausage, or for anything else for which a dimpled appearance is desired.)

The netting used in this process arrives from the manufacturers in a flattened state and wrapped circumferentially on a disposable cylinder. The netting has to be shirred onto a temporary netting tube. This shirring process, or "rucking", involves placing the netting coaxially onto the netting tube. The temporary netting tube, having had netting shirred or rucked onto it, is then attached coaxially to the product tube of a stuffer. As the food product is forced through the product horn, the netting is pulled off the netting tube so that the now-filled casing is enclosed in netting. The process is described in, for example, U.S. Pat. No. 7,063,610, the disclosure of which is incorporated by reference.

In this process, the netting is pulled freely so long as the product continues to exert pressure. The user of the apparatus determines by estimation the point at which to seal the sausage by clipping the netting and casing. Accordingly, the sizes of sausages prepared vary according to the accuracy of the operator. Consumers prefer to have consistent sizes of sausages. Additionally, it is easier for the sausage manufacturer to package sausages of a predetermined, consistent size, and the need to weigh individual packages may be obviated if the sausages are of a consistent size.

A need therefore exists for an apparatus that will prepare sausages of a predetermined and consistent length. The present invention, by allowing only a predetermined amount of netting to be derucked from the netting tube, meets this need.

BRIEF SUMMARY OF THE INVENTION

The net derucking rectifier system of the preferred embodiment of the present invention a stuffer, a product horn having an upstream end and a downstream end, the upstream end mounted to the stuffer, a netting tube having an upstream end and a downstream end, the netting tube removably mounted coaxially over the product horn and having a tubular netting shirred thereon, a bracket mounted coaxially to the netting tube and having a plurality of fingers pointing radially inward to grip the netting, the bracket movable between a first position near the upstream end and a second position near the downstream end, the fingers biased to grip the netting when the bracket is moved from the first position to the second position and not to grip the netting when the bracket is moved from the second position to the first position, and a clipper located adjacent the distal end of the netting tube.

In another embodiment, the present invention comprises a method of derucking a predetermined length of netting shirred on a tube, comprising gripping the netting in a first position on the tube, moving the gripped netting from the first position to a second position a predetermined distance axially along the tube, releasing the netting at the second position, and regripping the netting at the first position.

DETAILED DESCRIPTION OF THE PREFERRED EMBODIMENT OF THE INVENTION

Figure 1:
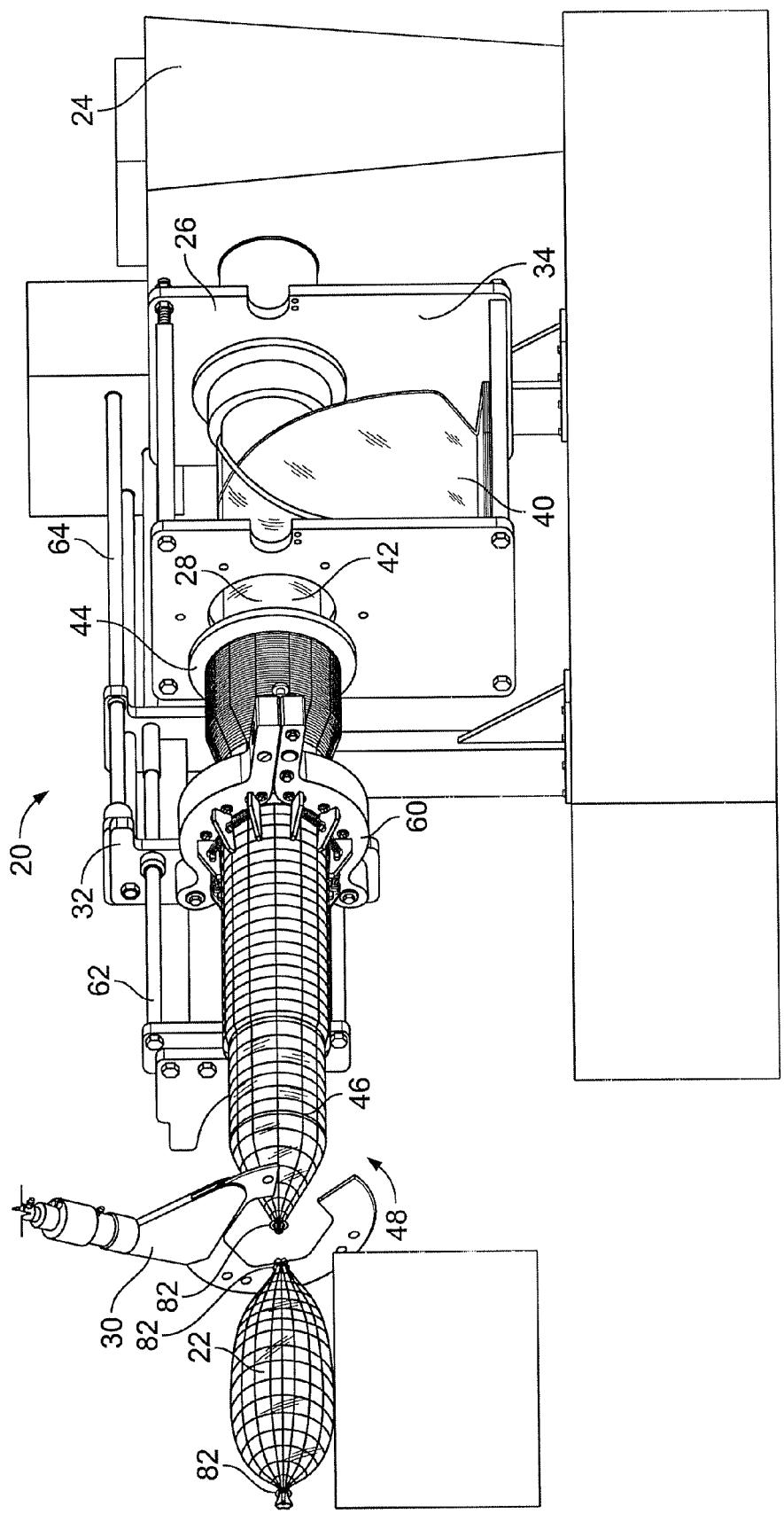
FIG. 1 is a side perspective view of the net derucking rectifier of the preferred embodiment of the present invention, showing the bracket in a first position, and a completed sausage.

The organization and manner of the method of the preferred embodiments of the invention, together with further objects and advantages thereof, may best be understood by reference to the following description, taken in connection with the drawings.

The derucking rectifier system 20 of the preferred embodiment of the present invention will be described as it is used to create sausage 22, but can also be used for whole muscle meats (such as hams or turkey breasts), cheeses, vegetarian sausage, or other products that are to be netted. Derucking rectifier system 20 has a mixer 24, a stuffer 26 receiving products from the mixer 24, a product horn 28 projecting from the stuffer 26, a clipper 30, and a derucking rectifier 32. All components can be mounted on a single frame, as illustrated in FIGS. 1, 2, 3, and 5, or the derucking rectifier 32 can be on its own frame standing downstream of stuffer 26.

Product horn 28 connects mixer 24 to the upstream side 34 of stuffer 26. Pasty sausage product, usually a mixture of meat and spices, is mixed in mixer 24 and pumped through product horn 28 to stuffer 26.

Plow 36 is located at the proximal or upstream end 38 of product horn 28. Plow 36 forms sheets of film 40 into tubular casing 42 around the outside of product horn 28. The process of forming sheets of film into a tubular casing is described in, for example, U.S. Pat. No. 4,910,034, Process for the Production of Meat Products, the disclosure of which is incorporated herein by reference. Film 40 can be supplied in fan-fold format, as illustrated in FIGS. 1 through 5 of the present application, or can be supplied in a roll as illustrated in the '034 patent. In the preferred embodiment, film 40 is a collagen film, such as is sold under the trademark COFFI®. Film 40 can be collagen, reinforced collagen, cellulose, natural, synthetic, or other material as is known in the art that can be formed into a tube. In another embodiment, tubular casing 42 is pre-formed from, for example, natural products (for example, hog, beef, or sheep) and is then shirred onto product horn 28.

Figure 5:
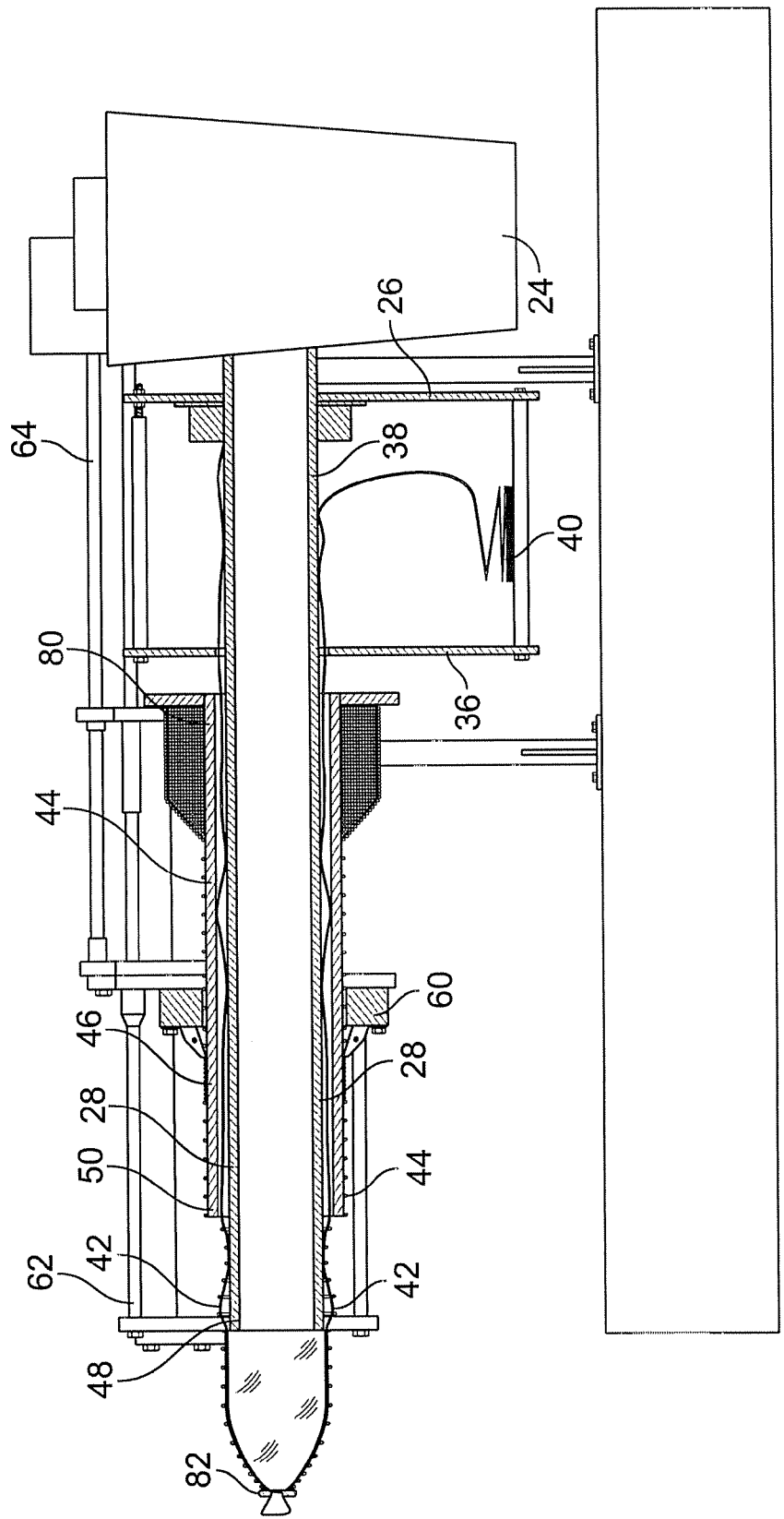
FIG. 5 is a cutaway side elevation view of the rectifier of FIG. 1.

Netting tube 44 holds netting 46. Preferred methods of rucking netting 46 onto netting tube 44 are described in, for example, U.S. Pat. No. 7,051,415, Net Rucking Apparatus and Method, the disclosure of which is incorporated by reference. Netting tube 44 is mounted coaxially to product horn 28, so that casing 42 is in the annular space between product horn 26 and netting tube 44. Clipper 30 is located at the downstream or distal end 48 of product horn 28. Preferably, downstream end 48 of product horn 28 extends slightly downstream of the downstream or distal end 50 of netting tube 44, as shown in FIG. 5.

Figure 2:
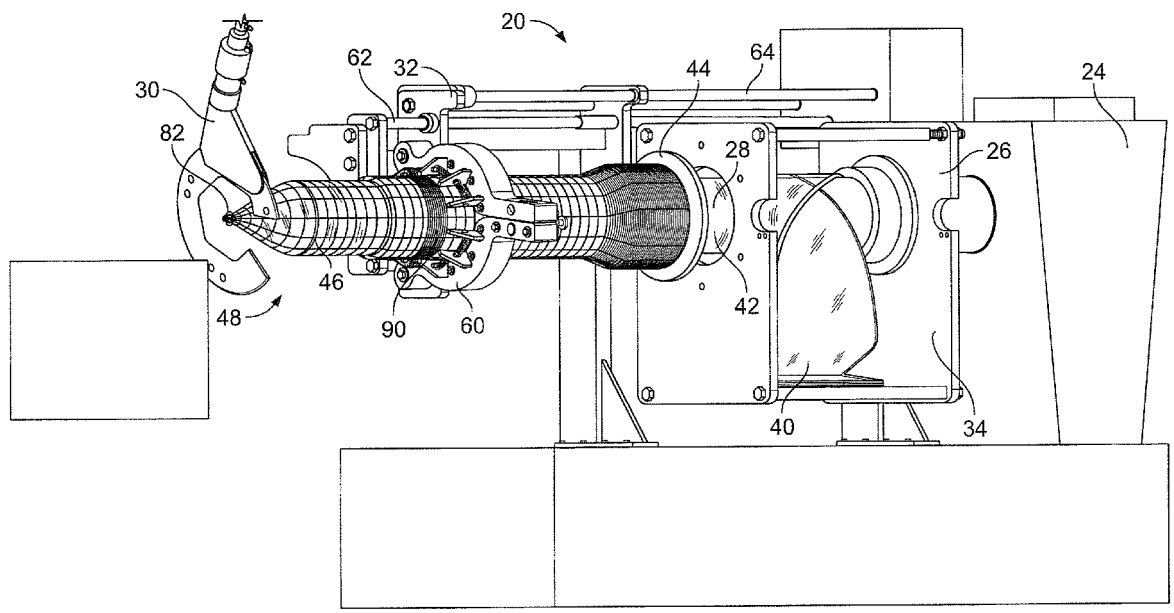
FIG. 2 is a side perspective view of the rectifier of FIG. 1, with the bracket is a second position and a sausage in the process of being made.
Figure 3:
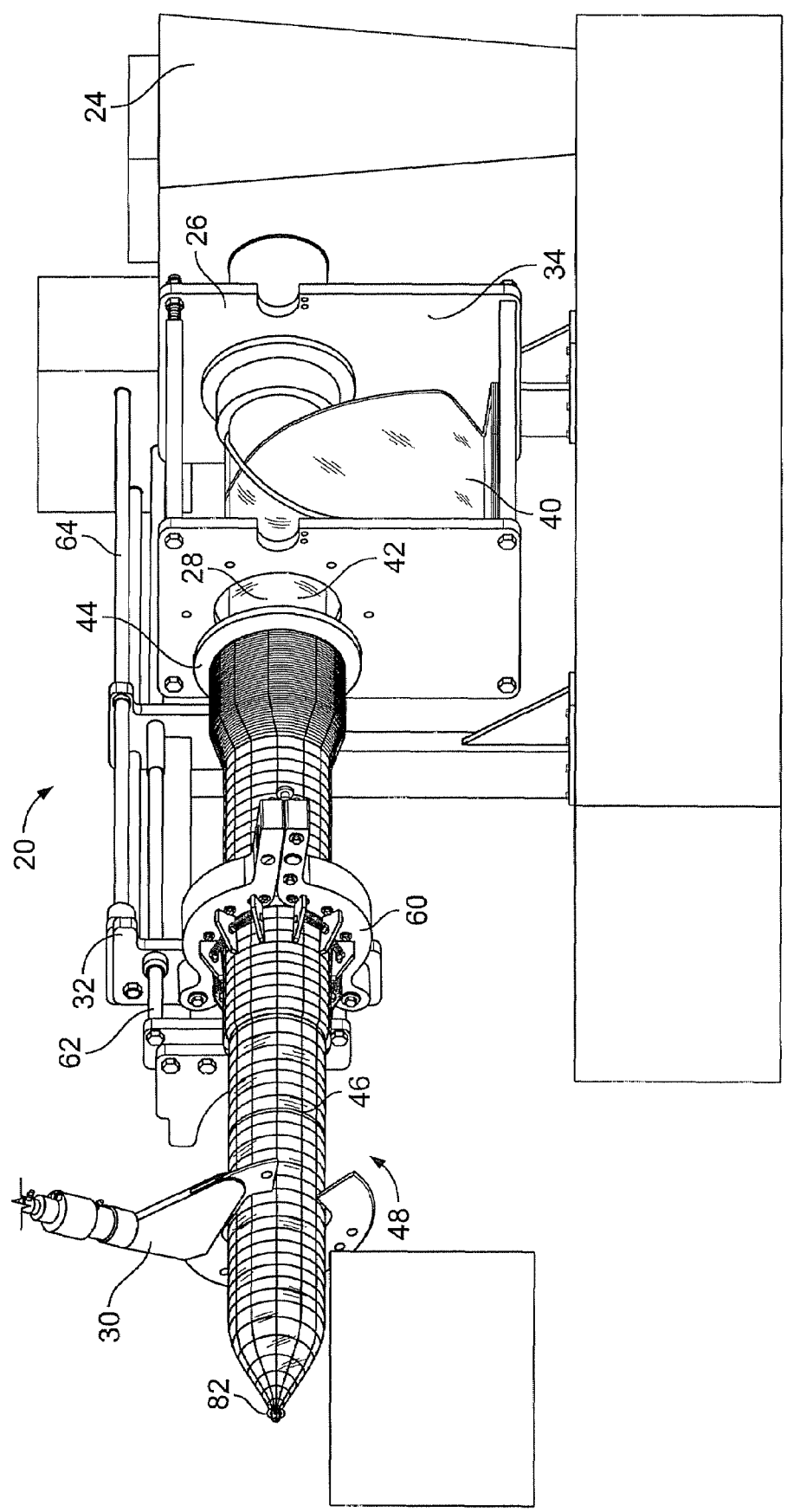
FIG. 3 is a side perspective view of the rectifier of FIG. 1, with the bracket in an FIG. 4 is a detailed view of the bracket of the rectifier of FIG. 1.
Figure 4:
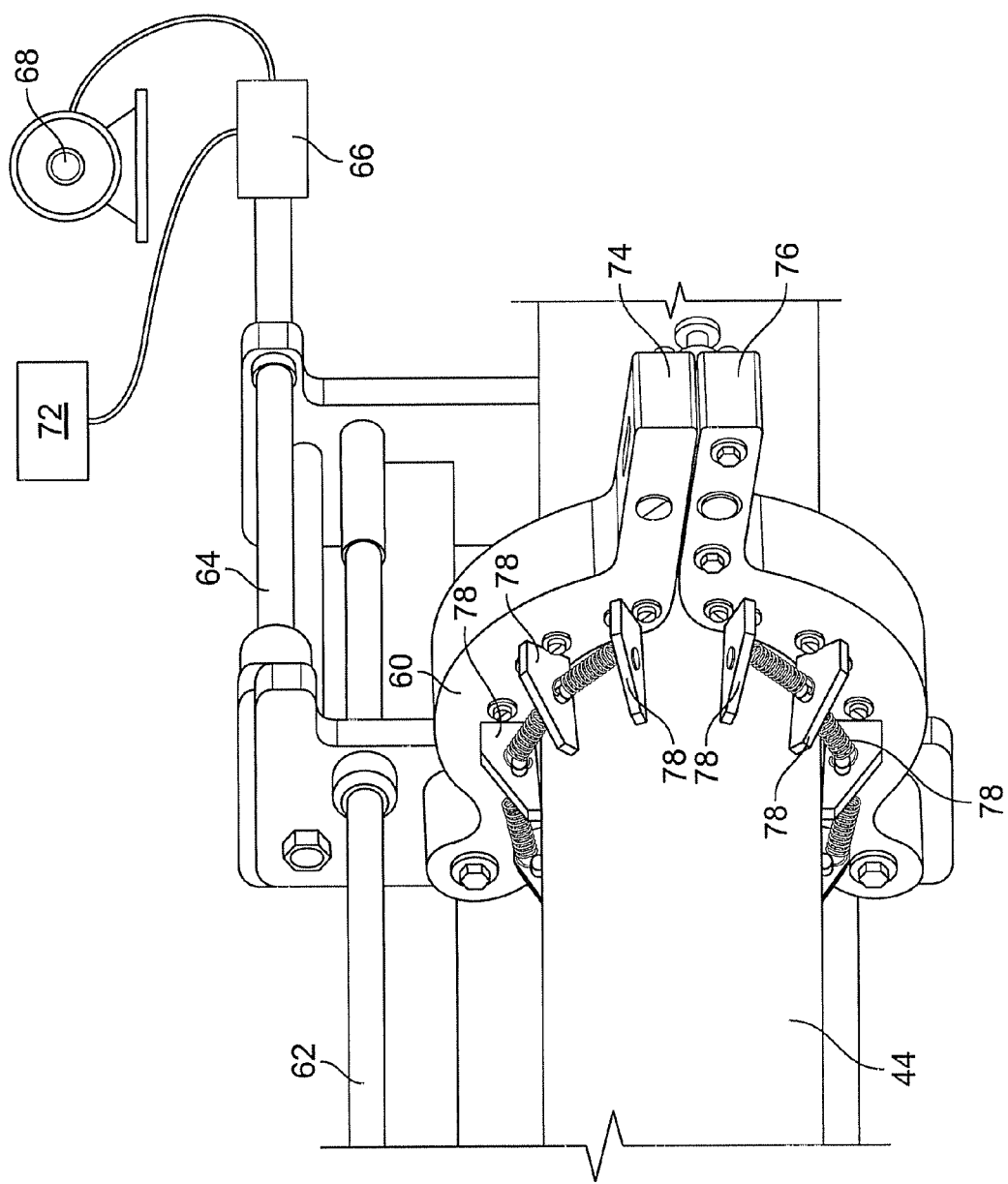

Annular bracket 60 is slidably attached to a pair of rods 62, 64, which are mounted parallel to product horn 28. Air cylinder 66, as shown in FIG. 4, is connected to a compressed air supply 68, such as from a plant air system. Air cylinder 66 is controlled by a controller 72, which is a programmed logic controller, analog controller, or other similar system, but could also be manually operated. Air cylinder 66 moves bracket 60 back and forth from a first position along the length of product horn 28, proximal to proximal end 38 of product horn 28, to a second position near the downstream end 48 of product horn 28. FIG. 1 shows bracket 60 in its first position; FIGS. 2 and 3 shown bracket 60 in its second position, and FIG. 5 shows bracket 60 in a position intermediate between the first position and the second position.

Annular bracket 60 surrounds netting tube 44. Annular bracket 60 is preferably a pair of separable jaws 74, 76 that open wide enough to allow product horn 28 and netting tube 44 to be inserted between jaws 74, 76. Jaws 74, 76 then close to form an annulus around netting tube 44.

Annular bracket 60 has a plurality of spring-loaded fingers 78 projecting radially inward from the downstream side of annular bracket 60. Fingers 78 are biased to move radially outward when annular bracket 60 moves upstream along the length of netting tube 44 and are biased to move radially inward when annular bracket 60 is moved axially downstream. Accordingly, movement of annular bracket 60 downstream along netting tube 44 causes fingers 78 to catch netting 46 and move netting 46 downstream. Movement of annular bracket 60 upstream causes fingers 78 to slide over netting 46 and therefore not change the position of netting 46.

The operation of derucking rectifier system 20 will now be described. An amount of netting 46 sufficient to encase a batch of sausages 22 is rucked onto netting tube 44, using any suitable method but preferably using the method described the '415 patent. The netting 46 is concentrated or layered at the proximal or upstream end 80 of netting tube 44. Netting tube 44 is then mounted coaxially over product horn 28, as shown in FIGS. 1, 2, 3, and 5.

A sheet of film 40 is placed below plow 36 and pulled over plow 36 to form tubular casing 42, which is pulled to the distal end 48 of product horn 28. An initial clip 82 is applied to close the downstream ends of tubular casing 42 and netting 46. Pasty sausage meat, mixed in mixer 24, is pumped through product horn 28. Annular bracket 60 is initially placed at the first position as shown in FIG. 1.

Controller 72 directs air cylinder 66 to move annular bracket 60 from the first position, as shown in FIG. 1, to the second position, as shown in FIG. 2. As bracket 60 moves along the length of netting tube 44, fingers 78 pull netting 46 along the way. A length 90 of netting 46, equal to the distance between the first position and the second position of bracket 60, is moved to and bunched up at distal end 50 of netting tube 44. In a first embodiment, bracket 60 stays at the second position. As the sausage meat fills tubular casing 42, the filled tubular casing proceeds downstream, pulling casing 42 and netting 46, as shown in FIG. 3. Casing 42 continues to be supplied in the annular space between product horn 28 and netting tube 44 and netting 46 is supplied from length 90. When length 90 of netting 46 is exhausted, as shown in FIG. 3, the operator knows to apply clipper 30 to clip and sever the casing 42 and netting 46 in a conventional manner to form sausage 22. Controller 72 then directs air cylinder 66 to move annular bracket 60 back to the first position and the process repeats. FIG. 1 shows sausage 22 having been stuffed and having clips 82 at both ends. The casing 42 and tubular netting 46 still on rectifier 20 have clip 82 closing the downstream end and the system 20 is ready to form the next sausage.

In a second embodiment, after bracket 60 moves to the second position, bringing a length of netting 90 to that position, it returns to the first position as the sausage 22 is made.

In this manner, sausages 22 of a consistent length are produced, as each sausage 22 has a length approximately equal to length 90, the distance between the first position and the second position of netting tube 44.

When sausages of different lengths are desired, the first position of bracket 60 can be adjusted, either mechanically or automatically by suitable commands from controller 72.

In another embodiment, preformed tubular casing 42 is shirred onto product horn 28. A preferred method of shirring tubular casing onto a product horn is described in U.S. Pat. No. 7,063,610 to Mysker, Apparatus and Method to Net Food Products in Shirred Tubular Casing, the disclosure of which is incorporated herein by reference. Netting tube 44 is placed over product horn 28 and the process is otherwise identical to as described above.

While preferred embodiments of the present invention are shown and described, it is envisioned that those skilled in the art may devise modifications of the present invention without departing from the spirit and scope of the appended claims.

We claim:

1. A system for encasing material in casing and netting, comprising:
   a stuffer;
   a product horn having an upstream end and a downstream end, said upstream end mounted to said stuffer;
   a netting tube having an upstream end and a downstream end, said netting tube removably mounted coaxially over said product horn and having a tubular netting shirred thereon;
   a bracket comprising a pair of jaws, said jaws being separable a distance at least as great as a diameter of said netting tube said jaws closable to form an annulus, said bracket mounted coaxially to said netting tube and having a plurality of fingers pointing radially inward to grip said netting, said bracket movable between a first position near said upstream end of said netting tube and a second position near said downstream end of said netting tube, said fingers biased to grip said netting when said bracket is moved from said first position to said second position and not to grip said netting when said bracket is moved from said second position to said first position; and
   a clipper located adjacent said distal end of said netting tube.

2. The system of claim 1, wherein said fingers are spring-loaded.

3. An apparatus for rectifying netting, said apparatus comprising:
   a netting tube having an upstream end and a downstream end, said netting tube having a tubular netting shirred thereon;
   a bracket comprising a pair of jaws, said jaws being separable a distance at least as great as a diameter of said netting tube, said jaws closable to form an annulus, said bracket mounted coaxially to said netting tube and having a plurality of fingers pointing radially inward to grip said netting, said bracket movable between a first position near said upstream end of said netting tube and a second position near said downstream end of said netting tube, said fingers biased to grip said netting when said bracket is moved from said first position to said second position and not to grip said netting when said bracket is moved from said second position to said first position.

4. The apparatus of claim 3, wherein said fingers are spring-loaded.

5. The apparatus of claim 3, further comprising a stuffer and a product horn, said product horn having an upstream end and a downstream end, said upstream end mounted to said stuffer, said netting tube removably mounted coaxially over said product horn.

6. The apparatus of claim 5, wherein said fingers are spring-loaded.

* * * * *

UNITED STATES PATENT AND TRADEMARK OFFICE
CERTIFICATE OF CORRECTION

PATENT NO. : 7,441,386 B2
APPLICATION NO. : 11/553757
DATED : October 28, 2008
INVENTOR(S) : Robert Pinto and Eggo Haschke It is certified that error appears in the above-identified patent and that said Letters Patent is hereby corrected as shown below:

Column 2, Line 17 "with the bracket in an" should be

--with the bracket in an intermediate position and a sausage
in the process of being made.--

Signed and Sealed this

Thirty-first Day of March, 2009

JOHN DOLL
*Acting Director of the United States Patent and Trademark Office*